US012609100B2

(12) United States Patent
Sato et al.

(10) Patent No.: US 12,609,100 B2
(45) Date of Patent: Apr. 21, 2026

(54) CANCELLATION APPARATUS

(71) Applicant: NTT, Inc., Tokyo (JP)

(72) Inventors: Ryotaro Sato, Tokyo (JP); Noriyoshi Kamado, Tokyo (JP); Kazunori Kobayashi, Tokyo (JP); Masahiro Fukui, Tokyo (JP)

(73) Assignee: NTT, Inc, Tokyo (JP)

( * ) Notice: Subject to any disclaimer, the term of this patent is extended or adjusted under 35 U.S.C. 154(b) by 196 days.

(21) Appl. No.: 18/553,150

(22) PCT Filed: Apr. 5, 2021

(86) PCT No.: PCT/JP2021/014472
§ 371 (c)(1),
(2) Date: Sep. 28, 2023

(87) PCT Pub. No.: WO2022/215109
PCT Pub. Date: Oct. 13, 2022

(65) Prior Publication Data

US 2024/0185828 A1 Jun. 6, 2024

(51) Int. Cl.
*G10K 11/178* (2006.01)

(52) U.S. Cl.
CPC .............................. *G10K 11/17881* (2018.01)

(58) Field of Classification Search
CPC ....... G10K 11/17881; G10K 11/17857; G10K 2210/3219; G10K 2210/3214
See application file for complete search history.

(56) References Cited

U.S. PATENT DOCUMENTS

2008/0260174 A1 10/2008 Yokota
2013/0243225 A1 9/2013 Yokota
2020/0074978 A1 3/2020 Maeno et al.

FOREIGN PATENT DOCUMENTS

JP 2008271067 A 11/2008

OTHER PUBLICATIONS

Hideo Yuasa (2019) "Effective Use of Travel Time with Digital Goods Noise Canceling Headphones that Support "Working"" [online], Jun. 21, 2019, [Searched on Mar. 22, 2021], website: <URL:https://www.nttcom.co.jp/comware_plus/column/digital_goods/201906.html> with English translation generated by computer.

*Primary Examiner* — Ping Lee

(57) ABSTRACT

A cancellation device according to one aspect of the invention is a cancellation device that cancels noise coming to a region in a vicinity of a loudspeaker, the cancellation device including at least two loudspeakers 1 and one reference microphone 3, in which the cancellation device is configured such that an acoustic signal emitted in a sound emission direction of a same loudspeaker and an acoustic signal emitted in an opposite direction collide with each other, the at least two loudspeakers 1 and the reference microphone 3 are arranged on a same plane, the at least two loudspeakers 1 emit cancellation sound that cancels the noise in synchrony, and the plane is a plane including a boundary between a sound emission direction of the two loudspeakers 1 and a direction opposite to a sound emission direction.

1 Claim, 7 Drawing Sheets

| | ON SAME PLANE (RIGHT ABOVE) | ON SAME PLANE (RIGHT BESIDE) | ON DIFFERENT PLANE (INTERMEDIATE POINT) | ON DIFFERENT PLANE (IN REAR) |
|---|---|---|---|---|
| 100 Hz | 23 | 23 | 2 | 23 |
| 200 Hz | 20 | 22 | 4 | 22 |
| 300 Hz | 20 | 19 | 4 | 19 |
| 400 Hz | 26 | 25 | −6 | 17 |
| 600 Hz | 16 | 17 | 16 | 6 |

Fig. 7

CANCELLATION APPARATUS

CROSS-REFERENCE TO RELATED APPLICATIONS

This application is a U.S. 371 Application of International Patent Application No. PCT/JP2021/014472, filed on 5 Apr. 2021, the disclosure of which is hereby incorporated herein by reference in its entirety.

TECHNICAL FIELD

The present invention relates to a noise canceling technology.

BACKGROUND ART

Processing of canceling noise by emitting signals having a phase opposite to that of the noise coming to a listening region is called noise canceling (see, for example, Non Patent Literature 1).

A lot of audio equipment having a noise canceling function has been released. However, in such audio equipment such as a headphone or an earphone, noise cancellation is often performed for a very narrow region such as only the vicinity of an ear or the inside of an external acoustic opening that are listening regions.

This is because, in a case where noise cancellation is performed for a region wider than a very narrow region, a plurality of loudspeakers (including both a plurality of loudspeakers of the same characteristic and combination of loudspeakers of different sizes) needs to be combined, and signals that are not noise emitted from the loudspeakers are collected by a microphone that collects noise in order to generate signals for canceling noise, and as a result, howling occurs due to the signals emitted from the loudspeakers.

An object of the present invention is to provide a noise canceling device capable of targeting a region wider than the vicinity of an ear and hardly causing howling caused by signals emitted from loudspeakers.

This is because, in a case where noise cancellation is performed for a region wider than a very narrow region, a plurality of loudspeakers (including both a plurality of loudspeakers of the same characteristic and combination of loudspeakers of different sizes) needs to be combined, and signals that are not noise emitted from the loudspeakers are collected by a microphone that collects noise in order to generate signals for canceling noise, and as a result, howling occurs due to the signals emitted from the loudspeakers.

CITATION LIST

Non Patent Literature

Non Patent Literature 1: Hideo Yuasa, Effective Use of Travel Time with Digital Goods Noise Canceling Headphones that Support "Working", [online], Jun. 21, 2019, [Searched on Mar. 22, 2021], Internet <URL: https://www.nttcom.co.jp/comware_plus/column/digital_goods/201906.html>

SUMMARY OF INVENTION

Technical Problem

An object of the present invention is to provide a cancellation device that is a noise canceling device capable of targeting a region wider than the vicinity of an ear and hardly causing howling caused by signals emitted from loudspeakers.

Solution to Problem

A cancellation device according to one aspect of the invention is a cancellation device that cancels noise coming to a region in a vicinity of a loudspeaker, the cancellation device including at least two loudspeakers and one reference microphone, in which the cancellation device is configured such that an acoustic signal emitted in a sound emission direction of a same loudspeaker and an acoustic signal emitted in an opposite direction collide with each other, the at least two loudspeakers and the reference microphone are arranged on a same plane, the at least two loudspeakers emit cancellation sound that cancels the noise in synchrony, and the plane is a plane including a boundary between a sound emission direction of the two loudspeakers and a direction opposite to a sound emission direction.

Advantageous Effects of Invention

A region wider than the vicinity of an ear can be targeted, and howling caused by signals emitted from loudspeakers is less likely to occur.

BRIEF DESCRIPTION OF DRAWINGS

FIG. 7 is a diagram illustrating an example of an experimental result.

DESCRIPTION OF EMBODIMENTS

Figure 1:
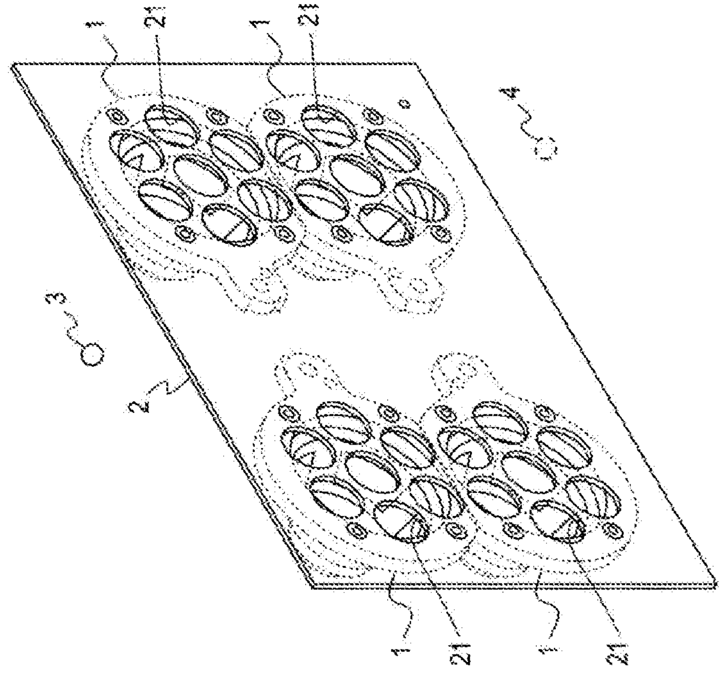
FIG. 1 is a perspective view of an example of a cancellation device.

Hereinafter, embodiments of the present invention will be described. In the drawings, constituents having the same functions are denoted by the same reference numerals, and redundant description will be omitted.

[Cancellation Device and Method]

As illustrated in FIGS. 1 to 5, a cancellation device includes, for example, loudspeakers 1, a fixing plate 2, and a reference microphone 3. In an example of FIGS. 1 to 5, the number of the loudspeakers 1 is four.

Figure 2:
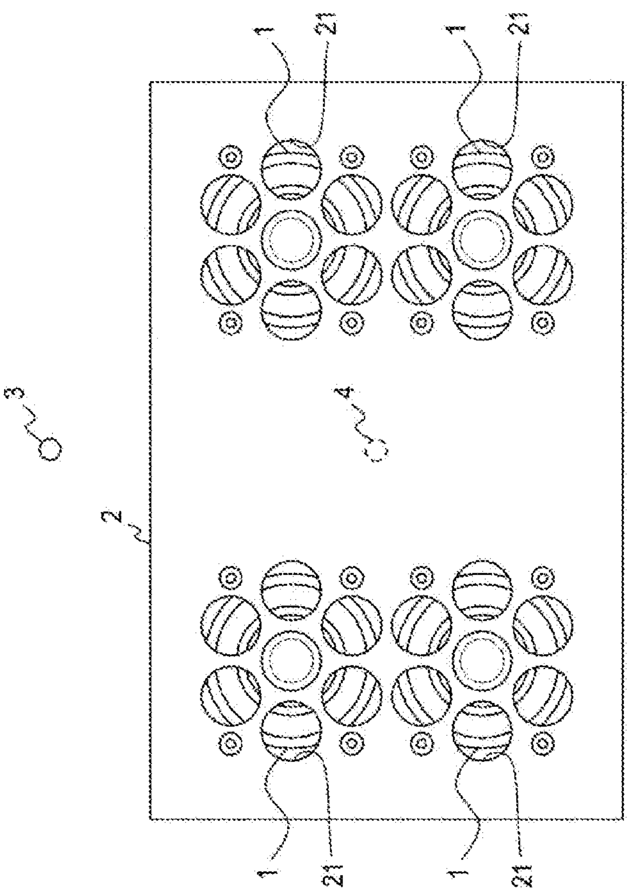
FIG. 2 is a front view of the example of the cancellation device.
Figure 3:
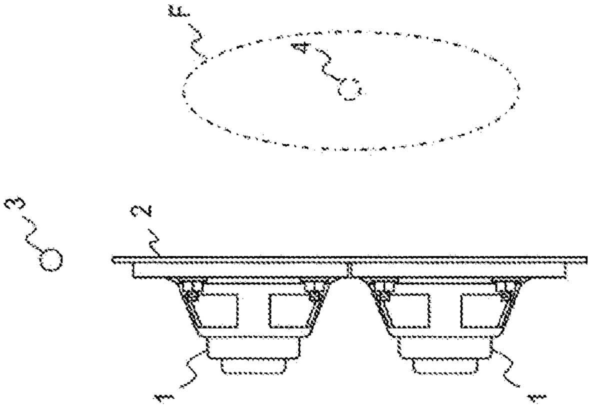
FIG. 3 is a left side view of the example of the cancellation device.
Figure 4:
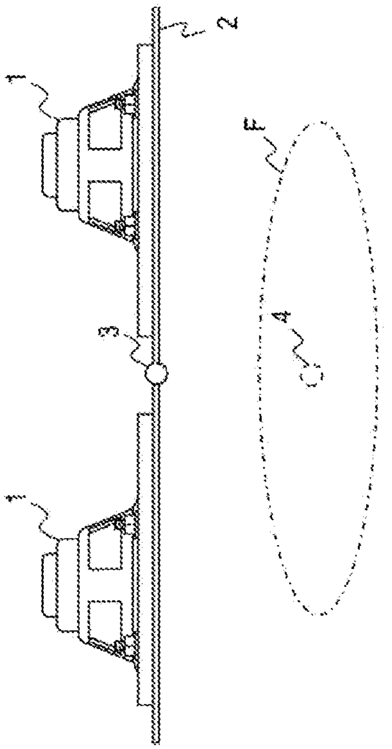
FIG. 4 is a plan view of the example of the cancellation device.
Figure 5:
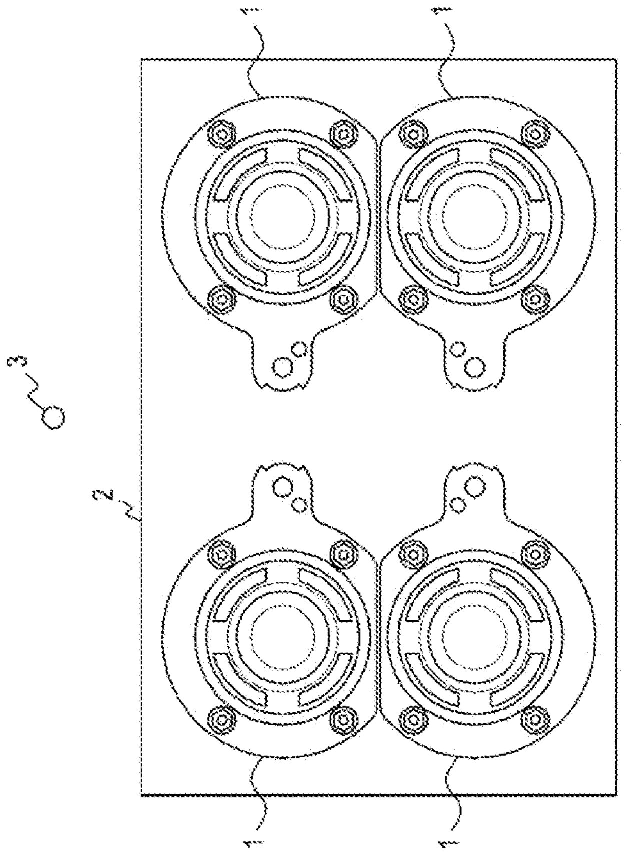
FIG. 5 is a rear view of the example of the cancellation device.

FIG. 1 is a perspective view of the example of the cancellation device. FIG. 2 is a front view of the example of the cancellation device. FIG. 3 is a left side view of the example of the cancellation device. FIG. 4 is a plan view of the example of the cancellation device. FIG. 5 is a rear view of the example of the cancellation device.

The fixing plate 2 is formed from, for example, aluminum. The fixing plate 2 is provided with sound emission holes 21. The four loudspeakers 1 are attached to the fixing plate 2 at the positions of the sound emission holes 21. Note that at least two loudspeakers 1 need to be provided. A plurality of loudspeakers 1 are installed on the same plane. For example, the plurality of loudspeakers 1 are laid in a lattice form, a honeycomb form, or evenly on the same plane.

In the example of FIGS. 1 to 5, each of the sound emission holes 21 includes seven holes. Each of the loudspeakers 1 is attached such that the center of a hole at the center of these seven holes corresponds to the center of the each of the loudspeakers 1. In the examples of FIGS. 1 to 5, the loudspeakers 1 are screwed to the fixing plate 2.

Note that in a case where there is a shielding object on the way of transmission from the loudspeakers 1 to an ear through the air, sound quality may be impaired. In order to avoid this, the sound emission holes 21 are opened.

Arranging the sound emission holes 21 with high symmetry with respect to the centers of the loudspeakers 1 makes generated sound fields more uniform, which is more preferable from the viewpoint of sound quality. However, the arrangement of the holes is not limited to this example. For example, the sound emission holes 21 may not be arranged at completely symmetrical positions with respect to the centers of the loudspeakers 1. For example, the sound emission holes 21 may be formed by, for example, six holes being arranged in a star form (one hole at the center+five holes around the center).

The sound emission holes 21 are provided, for example, at positions close to the loudspeakers 1, but relationship between the sound emission holes 21 and the loudspeakers 1 is not particularly limited thereto.

The number and arrangement of the sound emission holes 21 and the loudspeakers 1 are not limited to those described above.

The reference microphone 3 is arranged at a symmetrical position with respect to + and − sound fields generated by the loudspeakers 1. The symmetric position may be any position as long as the position is on the same plane as described above, but even more preferably, the position is a position at which sound coming directly (without collision or reflection of various objects on the way) can be recorded from noise.

In FIGS. 1 to 5, the reference microphone 3 is arranged above the center of the fixing plate 2. The reference microphone 3 is supported by, for example, an extending body extending from the fixing plate 2. In FIGS. 1 to 5, the extending body is not illustrated.

In other words, in the example of FIGS. 1 to 5, the reference microphone 3 is arranged on the same plane as the loudspeakers 1. This plane can be said to be a plane including a boundary between a sound emission direction of the loudspeakers 1 and the direction opposite to the sound emission direction. As long as the reference microphone 3 is arranged on the same plane as the loudspeakers 1, the reference microphone 3 may not be arranged above the loudspeakers 1. For example, the reference microphone 3 may be arranged beside the fixing plate 2.

A signal processing device (not illustrated) is connected to the cancellation device. Signals collected by the reference microphone 3 are input to the signal processing device. The signal processing device performs predetermined sound signal processing for canceling the signals collected by the reference microphone (so-called ANC processing), such as phase inversion, time delay, and emphasis of a specific frequency, on the signals collected by the reference microphone 3, and inputs the signals after the sound signal processing to the loudspeakers 1.

The loudspeakers 1 emit sound on the basis of the input signals. In other words, the loudspeakers 1 emit cancellation sound that cancels noise in synchrony.

As illustrated in FIGS. 1 to 5, the cancellation device is configured such that acoustic signals emitted in the sound emission direction of the same loudspeakers 1 and acoustic signals emitted in the opposite direction collide with each other. For example, the cancellation device or the loudspeakers 1 do not include a loudspeaker box. As a result, + and − sound fields are generated in front of and behind the loudspeakers 1, respectively.

By the reference microphone 3 being arranged symmetrically with respect to the + and − sound fields generated by the loudspeakers 1, signals reaching to the reference microphone 3 from the loudspeakers 1 are canceled at the position of the reference microphone 3. Therefore, wraparound of sound from the loudspeakers 1 to the reference microphone 3 can be reduced or eliminated.

In order to reduce noise in a wide area, generating wide and uniform sound fields using a plurality of loudspeakers 1 as secondary sound sources is important. At this time, by all the loudspeakers 1 being arranged on the same plane, even in a situation where there is a plurality of the loudspeakers 1, the reference microphone 3 can be arranged symmetrically with respect to + and − sound fields generated by the loudspeakers 1.

Using these configurations, the cancellation device can cancel noise coming in a region in the vicinity of the loudspeakers 1. More specifically, the cancellation device can suppress noise such as noise in an area in front F of the cancellation device (see FIGS. 3 and 4).

Note that, in a case where the number of the loudspeakers 1 is increased, noise coming in a wider region can be canceled. Furthermore, by the distance of the loudspeakers 1 being elongated, noise coming in a wider region can be canceled. On the other hand, by the distance between the loudspeakers 1 being shortened, silencing performance in a region of the intermediate point of a plurality of the loudspeakers 1 can be improved.

Modification

While the embodiments of the present invention have been described above, specific configurations are not limited to these embodiments, and it is needless to say that appropriate design changes, and the like, are included in the present invention within the scope of the present invention without deviating from the gist of the present invention.

For example, the cancellation device may be applied to an optical wave or a radio wave.

Furthermore, the cancellation device may further include an error microphone 4 for confirming an effect of cancellation. In FIGS. 1 to 5, the error microphone 4 is indicated by a dotted line. The error microphone 4 is arranged, for example, at the center of the front of the loudspeakers 1.

In this case, the reference microphone 3 is arranged at a position where the phase characteristic from the loudspeakers 1 to the error microphone 4 is opposite to the phase characteristic of the reference microphone 3 from the loudspeakers 1, instead of the plane on which the loudspeakers 1 are arranged. For example, the reference microphone 3 is arranged in a region in an opposite direction to a region where cancellation is desired to be performed with respect to the loudspeakers 1.

This also reduces wraparound from the loudspeakers 1 to the reference microphone 3, and makes howling less likely to occur.

Figure 6:
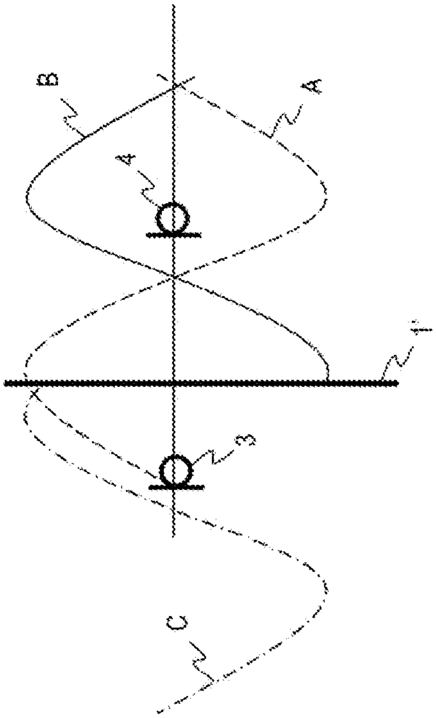
FIG. 6 is a diagram for describing that wraparound from loudspeakers to a reference microphone can be suppressed.

For example, in a case where the error microphone 4 is arranged in front of the loudspeakers 1 as illustrated in FIG. 6, the reference microphone 3 is arranged in the rear of the loudspeakers 1. In FIG. 6, the loudspeakers 1 are not illustrated for simplification of the drawing. Instead, in FIG. 6, a plane on which the loudspeakers 1 are arranged is denoted by a reference numeral 1'. In FIG. 6, the error microphone 4 is arranged at a position that is in front of the loudspeakers 1 and 15 cm away from the plane 1' on which the loudspeakers 1 are arranged. Furthermore, in FIG. 6, the reference microphone 3 is arranged at a position that is in the rear of the loudspeakers 1 and 10 cm away from the plane 1' on which the loudspeakers 1 are arranged.

As illustrated in FIG. 6, a waveform B (indicated by a solid line in FIG. 6) having an opposite phase to a waveform A (indicated by a broken line in FIG. 6) of the reference microphone 3 is generated in front of the loudspeakers 1.

As a result, a waveform C (indicated by an alternate long and short dash line in FIG. 6) having an opposite phase to the waveform B is generated in the rear of the loudspeakers 1.

At this time, in a case where the wavelength of noise is long, in other words, in a case where the frequency of the noise is low, howling does not occur even if the noise and control sound output from the loudspeakers 1 are added at the position of the error microphone 4, and the noise can be canceled.

Note that, in a case where the position of the reference microphone 3 and the position of the error microphone 4 are substantially targets with respect to the plane 1' on which the loudspeakers 1 are arranged, and the ¼ wavelength of simulated noise to be controlled is longer than the distance between the plane 1' on which the loudspeakers 1 are arranged and the reference microphone 3 and the distance between the plane 1' on which the loudspeakers 1 are arranged and the error microphone 4, noise can be suppressed even if the reference microphone 3 is arranged in the rear of the loudspeakers 1.

In addition, it is needless to say that modifications can be appropriately made without departing from the gist of the present invention.

Experimental Example

In order to confirm effectiveness of the arrangement of the reference microphone 3 proposed so far, an experiment was performed. The results of this experimental example are described below. A cancellation device used in this experiment is similar to that illustrated in FIGS. 1 to 5 and described in the section of [Cancellation Device And Method] except for the position of the reference microphone 3.

Filtered-X LMS algorithm (tap length 2400, alpha=0.001, leakage=0.01) was used for designing a filter that generates secondary sound source reproduction sound from a signal collected by the reference microphone 3. As simulated noise, sine waves of 100, 200, 300, 400, and 600 Hz were used.

The error microphone 4 was arranged at a position that is in front of the loudspeakers 1 and 15 cm away from the plane 1' on which the loudspeakers 1 are arranged.

The reference microphone 3 was arranged (1) on the same plane as the loudspeakers 1 and above the loudspeakers 1, (2) on the same plane as the loudspeakers 1 and beside the loudspeakers 1, (3) at an intermediate position between the plane on which the loudspeakers 1 are arranged and the error microphone 4, and (4) at a position that is in the rear of the loudspeakers 1 and 10 cm away from the plane 1' on which the loudspeakers 1 are arranged.

FIG. 7 illustrates a noise suppression amount [dB] in the error microphone 4 in a case where the reference microphone 3 is arranged at each of positions (1) to (4).

According to FIG. 7, in cases (1) and (2), in other words, in a case where the reference microphone 3 is arranged on the same plane as the loudspeakers 1, it can be seen that noise can be stably suppressed regardless of the frequency of the simulated noise.

Furthermore, in a case of (4), in other words, in a case where the reference microphone 3 is arranged in the rear of the loudspeakers 1, it can be seen that noise can be suppressed in a case where the frequency is low (in this experimental example, in a case where the frequency is 400 Hz or less).

The invention claimed is:

1. A cancellation device that cancels noise coming to a region in a vicinity of a loudspeaker,
- the cancellation device comprising loudspeakers and one reference microphone,
- wherein the cancellation device at least in part is distinct from a speaker box,
- the loudspeakers are arranged on a same plane,
- the loudspeakers emit cancellation sound that cancels the noise in synchrony,
- the plane comprises a boundary between a sound emission direction of the loudspeakers and a direction opposite to the sound emission direction,
- the reference microphone is in a region that is in an opposite direction to a region where the noise is desired to be canceled,
- a ¼ wavelength of the noise to be canceled is longer than respective distances of a first distance and a second distance,
- the first distance is between the plane on which the loudspeakers are arranged and the reference microphone, and
- the second distance is between the plane on which the loudspeakers are arranged and an error microphone for confirming an effect of cancellation.

* * * * *